Oct. 17, 1944.            G. E. PASCO            2,360,816
                          RELIEF VALVE
                       Filed July 8, 1943
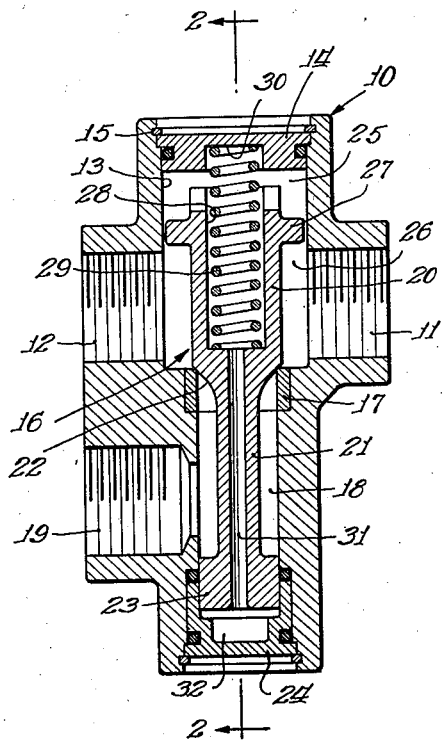
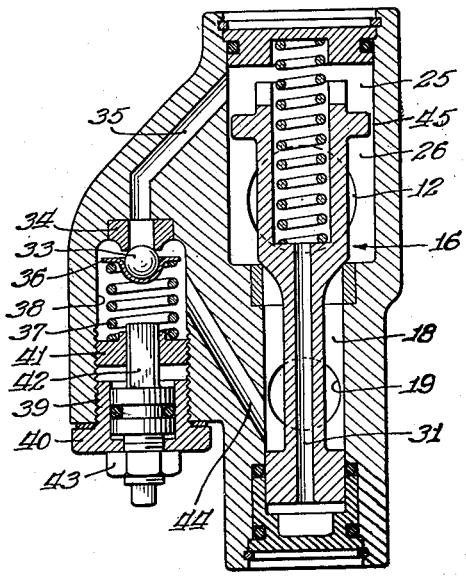
Inventor
George E. Pasco
By: Edward C. Fitzhugh
                Atty.

Patented Oct. 17, 1944

2,360,816

UNITED STATES PATENT OFFICE 2,360,816

RELIEF VALVE

George E. Pasco, Euclid, Ohio, assignor to Pesco Products Co., a corporation of Ohio Application July 8, 1943, Serial No. 493,877

4 Claims. (Cl. 137—53)

This invention relates to an improvement in relief valves utilized to prevent unit pressures within a hydraulic system from exceeding a predetermined maximum value.

Relief valves as ordinarily constructed are comprised of a valve body and cooperating valve seat inserted in the hydraulic system to be safeguarded at any convenient place in hydraulic communication with the fluid in the system, and serve to expose a return port or opening through which excessive pressures may be relieved. The valve itself is responsive to pressures existing within the system and the total pressure against the valve is balanced by means of a relatively weak spring. It has been found, however, that under certain conditions the natural period of the spring may substantially equal the natural period of the fluid when set in motion and then arrested by the opening and closing of the valve (hydraulic ram action). These two forces tend to build up and result in undesirable noise and wear in the valve.

To obviate the foregoing difficulty it has been proposed to provide a relief valve wherein the pressure within the system is utilized to keep the valve closed so that instead of acting in a direction to open the valve, the fluid pressure is led behind the valve to tend to keep the valve closed. This means that a very light spring may be used having a rate which will be sufficiently different from the natural frequency of the hydraulic system to avoid setting up any vibrations. The pressure releasing function is performed by means of an auxiliary valve, spring-pressed, which bleeds the pressure from behind the main valve to permit the pressure in the system to open the valve and thus reduce the pressure in the system.

The principal object of this invention is to simplify the construction of certain portions of a relief valve of the type described.

Another object of this invention is to provide a guide means for the valve, the guide means being located in the exhaust side of the valve.

These and other objects of this invention will become apparent from the following detailed description and the embodiments which are illustrated in the accompanying drawing wherein:

Fig. 1 is a section through a valve incorporating this invention and showing the connections to the high and low pressure side of the system to be safeguarded; and Fig. 2 is a section through the valve taken along lines 2—2 of Fig. 1.

The relief valve as shown in Fig. 1 is comprised of a housing 10 having internally threaded openings 11 and 12 which may be aligned so that the valve can be inserted directly into the main hydraulic system and in series therewith. It is understood, however, that the valve may be provided with only one opening and inserted into a pipe line which branches off from, but is hydraulically in communication with, the main hydraulic system.

Housing 10 has a valve bore 13 therein which, as shown in Fig. 1, extends crosswise of openings 11 and 12. Said valve bore 13 is closed at one end by means of a closure plate 14 which is held in place by a snap ring 15, and at the opposite end by a valve proper 22 forming part of a valve assembly 16, valve 22 engaging valve seat 17 in an exhaust opening 18. Said exhaust opening 18 is substantially aligned with valve bore 13 and has a threaded side outlet 19 which is parallel with and below internally threaded opening 12.

Valve assembly 16 is comprised of a substantially cylindrical body section 20, a stem of reduced diameter 21 extending into exhaust opening 18 and connected to cylindrical section 20 by means of valve proper 22. Said valve stem 21 terminates in a piston 23 which fits snugly in exhaust opening 18 and into a formed closure member 24 which together with exhaust opening 18 functions as a cylinder for piston 23.

Valve bore 13 is divided into an upper section 25 and a lower section 26 by a piston 27 which may be formed integrally with valve body 16 so as to be movable therewith. Said valve body 20 has an opening 28 therein to accommodate a relatively weak spring 29 which bears against valve body 16 at one end, the other end being received in a recess 30 in plate 14. Said spring 29 is not strong enough to maintain valve body 16 in closed position at all pressures up to the maximum permissible in the system, but serves merely to maintain valve 16 against its seat 17 when there is no appreciable fluid pressure within the system.

Opening 28 communicates with section 25 of the valve chamber and by means of a central bore of reduced section 31 communicates also with the closed end 32 of the cylinder formed by closure member 24 and exhaust opening 18. It will be observed that piston 27 is exposed on one side to the same unit pressure as piston 23 and on the other side to the unit pressure existing in the hydraulic system. It will also be noted that the total effective area of piston 23 is less than the total effective area of valve body 20 in section 25 and that piston 27 is of substantially the same area on both sides so that if the pressure in section 25 is the same as the pressure in the system, the net effect will be a force exerted on valve body 20 in a direction to close the valve.

It is apparent that some auxiliary means must be used to initiate the action of the relief valve if it is to perform its intended function. This auxiliary relief means is shown more clearly in Fig. 2 and comprises a ball-type valve 33 located in a bore 38 and coacting with a seat 34 to close a conduit 35 communicating with section 25 of valve bore 13. Said valve 33 is held against its seat 34 by means of a formed plate 36 and a spring 37 which bears against plate 36 and against an adjustable disc 41 screwed into threaded portion 39 or bore 38. Said disc 41 has a key slot connection with a pin 42 passing through a closure plate 40, a lock nut 43 on the outside thereof being utilized to maintain any desired compression in spring 37, thereby to adjust the pressure at which the main valve will open.

Bore 38 communicates through a passageway 44 with exhaust opening 18 and thence through threaded opening 19 to a suitable low pressure area.

It will be noted that passageway 44 terminates in the space between valve seat 17 and the back of piston 23 and that side outlet 19 is likewise so located. Thus piston 23 does not interfere in any way with the flow of exhaust fluid and yet it can be aligned with the remainder of the valve so that the machining of both the valve and the housing is relatively easy.

It is essential to the operation of the relief valve that upper section 25 be in hydraulic communication with lower section 26 of the valve bore 13. This communication is provided by a clearance 45 between piston 27 and valve bore 13. The clearance 45 acts as a restricted opening or orifice such that sudden pressure drops in chamber 25 will not be communicated directly to section 26.

The operation of the relief valve is as follows:

Initially valve 22 will be held upon its seat 17 by means of spring 29. Fluid enters section 26 of bore 13 through opening 11 or 12, or both, and will also flow through restricted opening 45 past piston 27 into section 25 and thence through conduit 35 to ball check valve 33. From section 25, the fluid will flow through opening 28, and bore 31 into cylinder 32. The pressure on ball valve 33 is adjusted to the maximum permissible in the system and hence pressure in both sections 26 and 25 will continue to rise to that normally required in the system, which it will be presumed is less than that for which ball valve 33 is set. Under these normal pressures piston 27 will be balanced, and the pressure then will be transmitted from chamber 25 against valve body 20 to hold the valve against its seat 17, and into bore 31 to the lower side of piston 23 so as to oppose the closing action of the fluid on valve body 20. Due to the previously noted difference in sizes of the effective areas exposed to the fluid under pressure, piston 23 will normally be unable to unseat the valve and hence the fluid pressure in the system will assist spring 29 to keep the valve seated.

When the pressure in the system exceeds that for which valve 33 is set, said valve will be forced open and pressure in conduit 35 and section 25 will immediately drop, the excess fluid escaping through passageway 44 into the exhaust opening 18. With the pressure in section 25 reduced, the pressure in cylinder 32 will likewise be reduced and a point will be reached wherein the pressure in section 26 will exceed that in 25. This unbalances piston 27 and causes the valve 20 to be raised from its seat 17 to permit a reduction in pressure in the system. Valve 22 will remain in its open position until the pressure drops to a point permitting valve 33 to close. With valve 33 closed the fluid under pressure passing through restricted opening 45 into section 25 will restore the fluid pressure necessary to hold valve 20 against its seat 17.

For some purposes it may be desirable to consider piston 27 and valve body 20 as one piston. Both are exposed on the same side to the pressure in section 25. Under ordinary circumstances, however, piston 27 is balanced so that it may be disregarded and valve body 20 may then be considered as a piston the effective area of which is the cross-sectional area of the valve seat 17a minus the cross-sectional area of bore 31. Piston 23 functions to balance part of the pressure exerted on valve assembly 16 as well as to center and guide valve 22 in its movements.

It is understood that the foregoing is merely illustrative of a preferred embodiment of the invention and that the scope of the invention therefore is not to be limited thereto but is to be determined by the appended claims.

I claim:

1. In a pressure relief valve assembly for a hydraulic system, a housing having a main valve chamber and an inlet opening therein for communicating with the hydraulic system, a combined piston and valve assembly in said chamber dividing the chamber into a first section including said inlet opening and a second section, said second section comprising an exhaust opening adapted to be closed by the valve, a valve stem in the exhaust opening, a piston at the end of the stem of smaller cross section than said first piston, said housing forming closed cylinders for the pistons, said stem and pistons having a passageway in communication with the closed cylinders a restricted bypass connecting the first piston chamber and the exhaust opening, a restricted passage connecting the first piston chamber and the inlet, a pressure release means controlling said by-pass, said first-mentioned piston acting to cause said valve to close the exhaust opening, and said valve stem piston acting to balance a portion of the pressure exerted by the first-mentioned piston when the valve is closed.

2. The combination of the pressure relief valve assembly as described in claim 1, wherein said by-pass and pressure release means are arranged for simultaneously relieving the pressure in the piston chambers, thereby leaving the first piston exposed to the pressure existing in the inlet opening to move the valve to open position.

3. The combination of the pressure relief valve assembly for a hydraulic system as described in claim 1, wherein said exhaust opening comprises a side outlet located between the valve and the balancing piston whereby said balancing piston, valve stem and valve may be aligned.

4. The combination of the pressure relief valve assembly as described in claim 1, wherein said bypass communicates with the exhaust opening between the valve and balancing piston, and said pressure release means comprises a ball check valve for closing the bypass except above a predetermined unit pressure in the inlet opening.

GEORGE E. PASCO.